(12) United States Patent
Molzow-Voit et al.

(10) Patent No.: US 10,363,782 B2
(45) Date of Patent: Jul. 30, 2019

(54) PNEUMATIC VEHICLE TIRE

(71) Applicant: Continental Reifen Deutschland GmbH, Hannover (DE)

(72) Inventors: Frank Molzow-Voit, Worpswede (DE); Darren Kidney, Wedemark (DE)

(73) Assignee: Continental Reifen Deutschland GmbH, Hannover (DE)

( * ) Notice: Subject to any disclaimer, the term of this patent is extended or adjusted under 35 U.S.C. 154(b) by 296 days.

(21) Appl. No.: 14/042,322

(22) Filed: Sep. 30, 2013

(65) Prior Publication Data
US 2014/0027034 A1 Jan. 30, 2014

Related U.S. Application Data

(63) Continuation of application No. PCT/EP2012/052570, filed on Feb. 15, 2012.

(30) Foreign Application Priority Data

Mar. 30, 2011 (DE) .................. 10 2011 001 657

(51) Int. Cl.
*B60C 13/00* (2006.01)
*B60C 13/04* (2006.01)
(Continued)

(52) U.S. Cl.
CPC .............. *B60C 13/00* (2013.01); *B60C 11/01* (2013.01); *B60C 15/0045* (2013.01);
(Continued)

(58) Field of Classification Search
CPC .... B60C 13/00; B60C 13/04; B60C 2013/045
See application file for complete search history.

(56) References Cited

U.S. PATENT DOCUMENTS 6,257,290 B1 7/2001 Sakamoto et al.
7,622,013 B2 * 11/2009 Ogawa .................. B29C 47/026
152/523
(Continued)

FOREIGN PATENT DOCUMENTS

GB 1361981 * 7/1974
GB 1168299 * 2/1976
(Continued)

OTHER PUBLICATIONS

Machine translation of JP 7-101211, 1995.*
(Continued)

*Primary Examiner* — Justin R Fischer
(74) *Attorney, Agent, or Firm* — Walter Ottesen, P.A.

(57) ABSTRACT

A vehicle pneumatic tire includes a tread, ply structure, and radial carcass extending around a bead core in each bead region and extending back under the ply structure. Side wall regions are formed by a wing rubber extending from the side of the tread toward the bead region and a rim protection rubber extending from the bead region toward the wing rubber. The wing rubber is the only rubber component extending to the tread and runs in the radially outer portion of the side wall region in contact with the carcass and covers the adjacent rubber component toward the bead region by the radially inner end section of the wing rubber. The adjacent rubber component includes an end section in the covered region narrowing toward the tread, the end of which is located a distance from a base line between 45% and 70% of the height determined therefrom.

5 Claims, 8 Drawing Sheets

(51) Int. Cl.
   *B60C 15/00* (2006.01)
   *B60C 15/024* (2006.01)
   *B60C 11/01* (2006.01)

(52) U.S. Cl.
   CPC .... *B60C 15/0242* (2013.01); *B60C 2011/016* (2013.01); *B60C 2013/045* (2013.01); *Y10T 152/10738* (2015.01)

(56) References Cited

U.S. PATENT DOCUMENTS

2006/0237112 A1  10/2006  Nishitani et al.
2011/0030862 A1   2/2011  Hayashi et al.

FOREIGN PATENT DOCUMENTS

| JP | 7-101211 | * | 4/1995 |
| JP | 60-128006 | * | 7/1995 |
| JP | 2000-198325 A | | 4/2000 |

OTHER PUBLICATIONS

International Search Report dated Jun. 4, 2012 of international application PCT/EP2012/052570 on which this application is based.

* cited by examiner

PNEUMATIC VEHICLE TIRE

CROSS REFERENCE TO RELATED APPLICATIONS

This application is a continuation application of international patent application PCT/EP2012/052570, filed Feb. 15, 2012, designating the United States and claiming priority from German application 10 2011 001 657.0, filed Mar. 30, 2011, and the entire content of both applications is incorporated herein by reference.

FIELD OF THE INVENTION

The invention relates to a pneumatic vehicle tire with a maximum nominal tire cross-sectional height of 100 mm, including a tread, a ply structure and a radial carcass, which, from axially inside to axially outside, extends around bead cores in bead regions and is made to extend back under the ply structure, and also with sidewall regions, which are each formed by at least two rubber components, a wing rubber, which extends from the tread in the direction of the bead region, and a rim protection rubber, which extends from the bead region in the direction of the wing rubber.

BACKGROUND OF THE INVENTION

A pneumatic vehicle tire of the type mentioned at the beginning is known from U.S. Pat. No. 6,257,290. The sidewall regions of the tire are each formed by three rubber components; apart from the wing rubber and the rim protection rubber, in each case there is a sidewall rubber, which extends from the ply structure along the axial outside of the carcass up to a protective rib. The sidewall rubber covered on the outside by the wing rubber runs into a position radially inside the tread and is in contact with the radial inside of the tread. The sidewall rubber is also designed and arranged in such a way that, in a region that lies between 45% and 70% of the tire cross-sectional height, the outer surface of the tire is not intersected by the following boundary lines: the boundary line between the tread and the sidewall rubber, the boundary line between the tread and the wing rubber, the boundary line between the sidewall rubber and the wing rubber and the boundary line between the sidewall rubber and the rim protection rubber. Such an arrangement of these rubber components in the sidewall regions of the tire is intended significantly to improve the durability of the tire; in particular, it is intended to keep down the stress between the rubber components in such a way that separations, cracks and the like at the boundaries between the various rubber layers are effectively prevented.

In the case of this known construction of the sidewall regions, relatively thin, extruded green rubber parts have to be used in the production of the tire. This makes it difficult to produce the rubber components at a high extrusion rate and there is the risk of these parts being damaged during the building of the tire. Should the tires have particularly thin sidewall regions, it is not permissible to go below a certain total component thickness, since two components must be positioned one on top of another.

SUMMARY OF THE INVENTION

It is an object of the invention to provide a pneumatic vehicle tire that can be produced with a very small thickness of the sidewall regions without there being the risk of the green rubber parts being damaged during the building of the tire. In addition, the invention is intended to make it possible to be able to produce the components at a high extrusion rate.

According to the invention, the object is achieved in that the wing rubber is the only rubber component extending up to the tread and running in contact with the carcass in the radially outer part of the sidewall region and it covers with its radially inner end portion the rubber component adjoining in the direction of the bead region, which in the covered region has an end portion which narrows in the direction of the tread and the end of which is at a distance from a baseline that is between 45% and 70% of the cross-sectional height determined from the baseline, the baseline running in the axial direction and being the line that is in contact with the outer end of the rim radius on a standard rim corresponding to the particular tire size.

In the case of a pneumatic vehicle tire configured according to the invention, therefore, the wing rubber is the only rubber component adjoining the tread in the radially outer regions of the sidewall regions, and can consequently be made thicker than in the case of the known design, in which the wing rubber shares the space available in the tire with the sidewall rubber. This single, voluminous wing rubber can be extruded much more easily and quickly than the thin wing rubber that is known from the prior art. The voluminous wing rubber also offers the advantage of being less susceptible to damage during handling in the building of the tire. With wing rubbers as the only rubber components in the radially outer sidewall regions, the thickness of the rubber can also be kept down in these regions.

In the case of tires with a tire cross-sectional height close to 100 mm, it is advantageous if the rubber component adjoining the wing rubber in the direction of the bead region is a strip-shaped sidewall rubber. The sidewall regions therefore include three rubber components, the rubber compositions of which can be correspondingly made to match one another with respect to their physical properties.

For troublefree production of the sidewall regions, it is advantageous if the sidewall rubber is covered on the outside by a strip-shaped extension of the wing rubber. In this case, the outer surfaces of the sidewall regions are mainly formed by the wing rubber and by the rim protection rubber.

In the case of another embodiment of the invention with three rubber components in each of the sidewall regions, the wing rubber covers with a narrowing end portion the narrowing end portion of the sidewall rubber, the radially inner end of the wing rubber being at a distance from the baseline that is less than the distance of the radially outer end of the narrowing end portion of the sidewall rubber from the baseline and being between 40% and 60% of the cross-sectional height determined from the baseline. In the case of this embodiment, the sidewall rubber also takes up a certain part of the outer surface of the sidewall regions, which is of advantage for example whenever a protective rib is formed in the region of the sidewall rubber.

In the case of another embodiment of the invention, the rubber component adjoining the wing rubber in the direction of the bead region is the rim protection rubber. In the case of this embodiment of the invention, therefore, the sidewall regions merely include two rubber components, since there is no longer a sidewall rubber.

The mutual arrangement and configuration of these two rubber components is for example such that the radially outer, narrowing end portion of the rim protection rubber is covered on the outside by the wing rubber in such a manner that the radially inner end of the wing rubber is at a distance from the baseline that is between 20% and 30% of the cross-sectional height. In the case of this embodiment, therefore, a comparatively great outer surface of the sidewall regions is taken up by the wing rubber. Any protective rib that may be provided would therefore be formed by the wing rubber.

In the case of an alternative embodiment with two rubber components in the sidewall regions, the wing rubber extends relatively little over the sidewall region and any protective rib provided would be formed by the rim protection rubber. In this case, the radially outer, narrowing end portion of the rim protection rubber is covered by the radially inner end portion of the wing rubber in such a manner that the radially inner end of the wing rubber is at a distance from the baseline that is less than the distance of the end of the narrowing end portion of the rim protection rubber from the baseline and is between 40% and 60% of the cross-sectional height determined from the baseline.

Embodiments with two rubber components in the sidewall regions can be implemented with preference in the case of tires of which the maximum tire cross-sectional height is 80 mm.

BRIEF DESCRIPTION OF THE DRAWINGS

The invention will now be described with reference to the drawings wherein.

Figure 1:
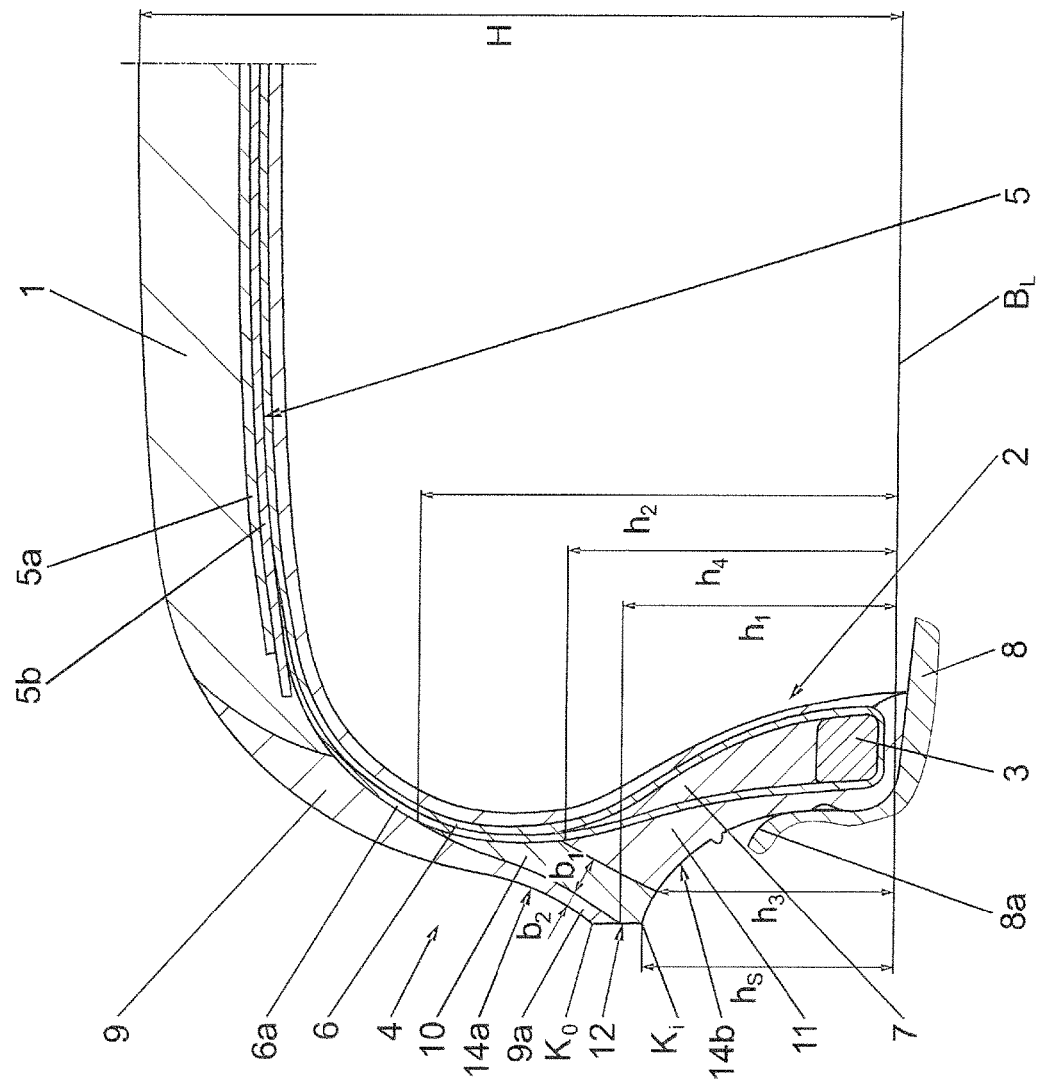
FIGS. 1 to 8 are cross-sectional views of a pneumatic vehicle tire according to different embodiments of the invention.

DESCRIPTION OF THE PREFERRED
EMBODIMENTS OF THE INVENTION

The sizes and dimensions specified in the description relate to a tire fitted on a standard rim under standard internal pressure, but in the unloaded state, according to the currently applicable version of the ETRTO Standard. The radial heights to which reference is made in the description are determined from a baseline $B_L$, which runs in the axial direction and intersects the rim where the outer end of the rim radius is located.

FIGS. 1 to 8 show sectional views of a pneumatic vehicle tire of a radial type of construction for passenger cars. Tires designed according to the invention have a cross-sectional ratio of at most 55%, in particular at most 40%; the maximum nominal tire cross-sectional height is 100 mm. The embodiments shown in FIGS. 3, 4, 7 and 8 are suitable in particular for tires with a maximum cross-sectional height of 80 mm.

The tires shown in the figures and fitted on a rim 8 with rim flanges 8a have a tread 1, bead regions 2 with bead cores 3, two sidewall regions 4, a ply structure 5 and a radial carcass 6. The sidewall regions 4 extend from the tire shoulders—laterally of the tread 1—up to the rim flanges 8a.

The tread 1, which is not the subject of the invention, may be configured or constructed in a known way, for example in two layers with a tread base and a tread cap. The tread 1 is also provided with a tread profiling in a way that is known and not shown.

The radial carcass 6 is made of at least one ply of rubberized cords, which run at least substantially in the radial direction. On each side of the tire, the carcass 6, running from axially inside to axially outside around the bead cores 3, reaches with its turned-back portions 6a into the region radially inside the ply structure 5. This produces overlapping regions between the portions 6a of the carcass 6 and the ply structure 5 that are of an order of magnitude of several millimeters to several centimeters. Radially outside the bead cores 3 there is, bounded by the carcass 6, a one-part or multi-part bead filler 7, which consists of one or more rubber mixtures.

The ply structure 5 has for example two bracing plies 5a, with reinforcing elements crossing one another, but running parallel in each ply, in particular of steel cord. The bracing plies 5a, 5b may be covered by a bandage, which is made of bandage cords, for example of nylon, embedded in rubber and running substantially in the circumferential direction.

Arranged in the sidewall regions 4 are three rubber components in the case of the embodiments shown in FIGS. 1, 2, 5 and 6 and two rubber components in the case of the embodiments shown in FIGS. 3, 4, 7 and 8. In the case of the embodiments shown in FIGS. 1, 2, 5 and 6, these rubber components include a wing rubber (9, 9', 9", 9'''), a sidewall rubber (10, 10', 10", 10''') and a rim protection rubber (11, 11', 11", 11'''). In the case of the embodiments shown in FIGS. 3, 4, 7 and 8, these rubber components include a wing rubber (19, 19', 19", 19''') and a rim protection rubber (21, 21', 21", 21''').

As will be described hereinafter, these rubber components may form a protective rib 12 (FIGS. 1 to 4) projecting on each side of the tire axially beyond the rim flange 8a of the rim 8. The protective rib 12 has a radially inner edge $K_i$ and a radially outer edge $K_O$, the distance between which, measured in the radial direction, is 2 mm to 6 mm. The radially inner edge $K_i$ of the protective rib 12 is at a distance $h_S$ from the line $B_L$ that is between 25% and 45% of the cross-sectional height H, likewise measured from $B_L$. The protective rib 12 is that part of the sidewall region 4 of the tire that has the greatest thickness. The greatest thickness of the rubber in the region of the rib 12—determined perpendicularly in relation to the carcass 6—is between 8 mm and 12 mm. From the radially outer edge $K_O$ and the radially inner edge $K_i$ of the rib 12, concavely curved outer surfaces (14a, 14b) preferably run in the direction of the tread 1 and the rim 8. It is also possible in principle to provide the sidewall regions 4 with a largely convexly curved outer contour, so that the thickness of the rubber of the sidewall regions 4 varies little.

In the case of the embodiments shown in FIGS. 5 to 8, there is no such definite protective rib; at the mentioned distance $h_S$ from the baseline $B_L$, the sidewall region 4 has an edge K, at which the sidewall region 4 has its greatest thickness.

In the case of the embodiment shown in FIG. 1, each wing rubber 9 extends over the shoulder region of the tire, laterally of the tread 1, into the protective rib 12, in contact with the tread 1 and the portion 6a of the carcass 6. Along the outer surface 14a, there runs a strip-shaped extension 9a of the wing rubber 9 that covers the sidewall rubber 10 on the outside. The sidewall rubber 10 runs approximately parallel to the extension 9a as a wide rubber strip from the turned-back portion 6a of the carcass 6 up to the outside of the protective rib 12. The strip-shaped extension 9a of the wing rubber 9 forms the radially outer edge $K_O$; the sidewall rubber 10 forms the radially inner edge $K_i$ of the protective rib 12. The radially inner end of the strip-shaped extension 9a is at a distance $h_1$ from the line $B_L$ that is between 30% and 45% of the height H. The rim protection rubber 11 adjoins the sidewall rubber 10 and runs from the latter, continuously becoming thinner, into the bead region 2 of the rubber and in the form of a strip along the contact surface of the bead region 2 with the rim 8. The radially outer, narrowing end portion of the sidewall rubber 10 ends at a distance $h_2$ from the line $B_L$ that is between 45% and 70% of the cross-sectional height H; the radially innermost end of the sidewall rubber 10 is at a distance $h_3$ from the line $B_L$ that is less than h1 and is between 20% and 30% of the cross-sectional height H. In its middle portion, the sidewall rubber 10 has a width $b_1$ of 2 mm to 4 mm; the width $b_2$ of the extension 9$a$ of the wing rubber 9 is 0.7 mm to 1.3 mm. The radially outer end of the rim protection rubber 11 is at a distance $h_4$ from the line $B_L$ that is greater than $h_1$ and is between 30% and 40% of the cross-sectional height H.

Figure 2:
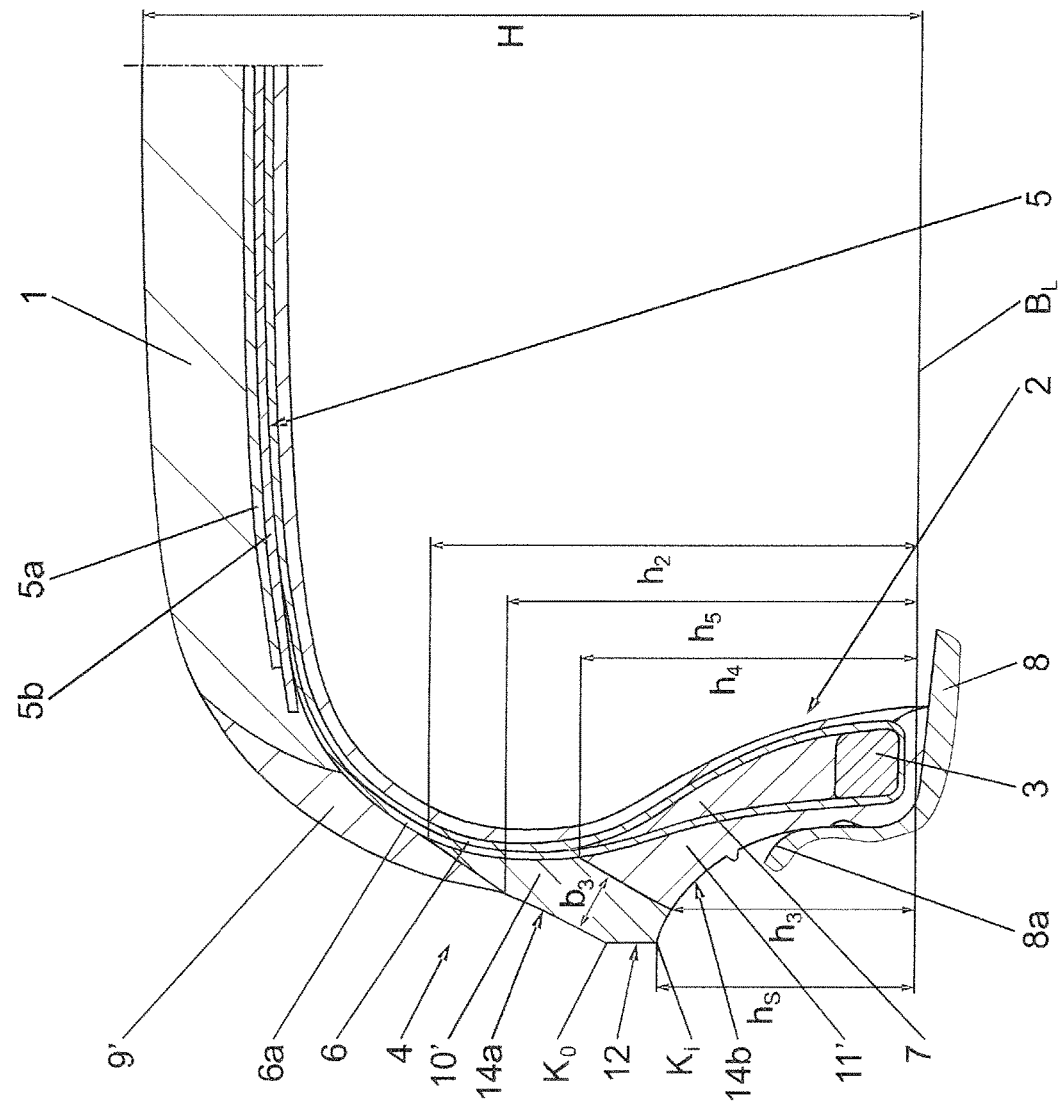

In the case of the embodiment shown in FIG. 2, the wing rubber 9 covers only the narrowing end portion of the sidewall rubber 10', which otherwise substantially forms the protective rib 12 and therefore also includes the two edges $K_i$ and $K_O$ of the protective rib 12. The sidewall rubber 10', designed substantially as a wide rubber strip, has in its middle portion a width $b_3$ of 3 mm to 5 mm; its radially outer, narrowing end portion ends at a distance $h_2$ from the baseline $B_L$ that is between 45% and 70% of the cross-sectional height H. The narrowing radially inner end portion of the wing rubber 9 ends at a distance $h_5$ from the baseline $B_L$ that is between 40% and 60% of the height H and is less than $h_2$. The arrangement and design of the rim protection rubber 11' correspond to the arrangement and design of the rim protection rubber 11 of the first embodiment.

Figure 3:
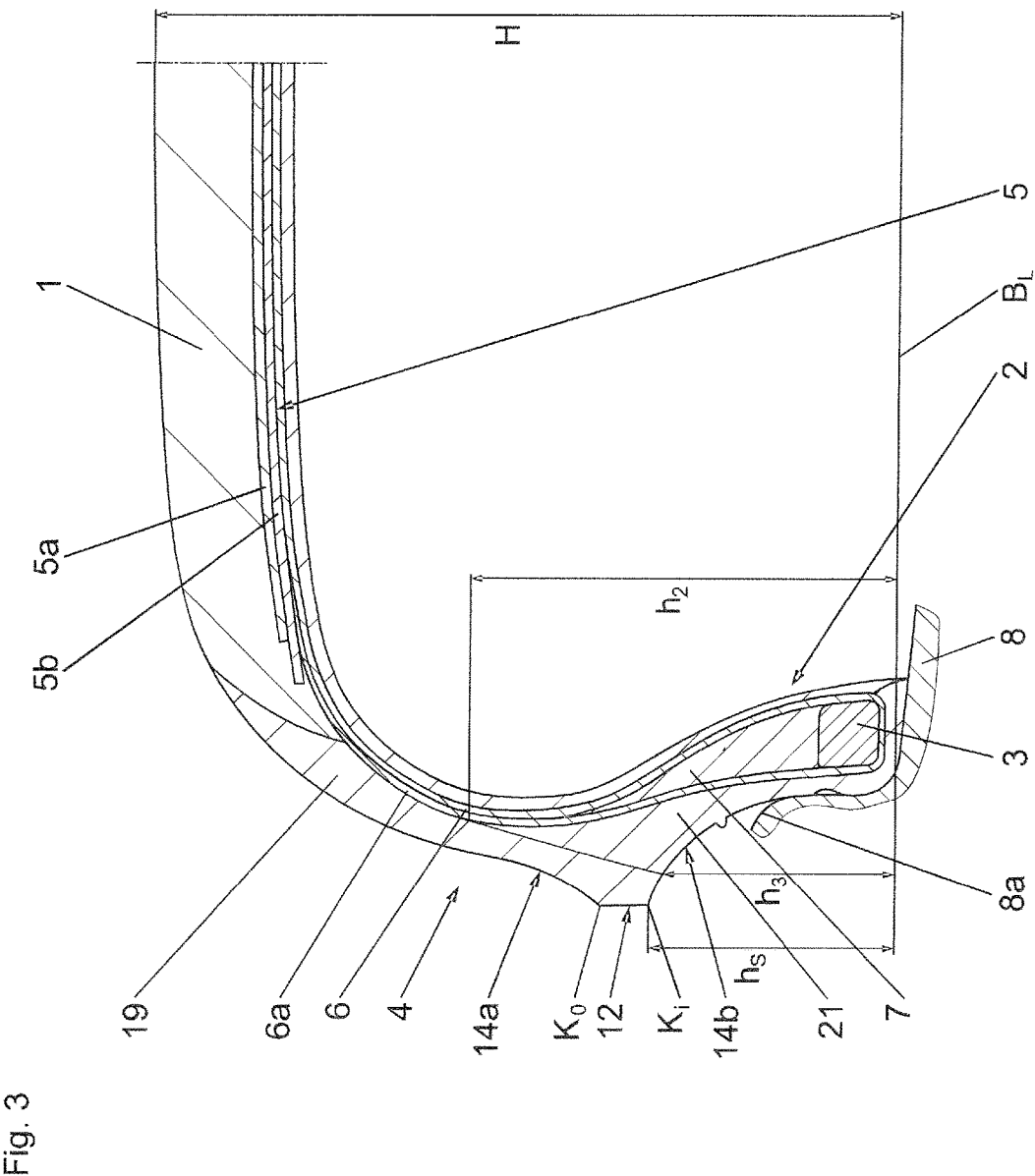
Figure 4:
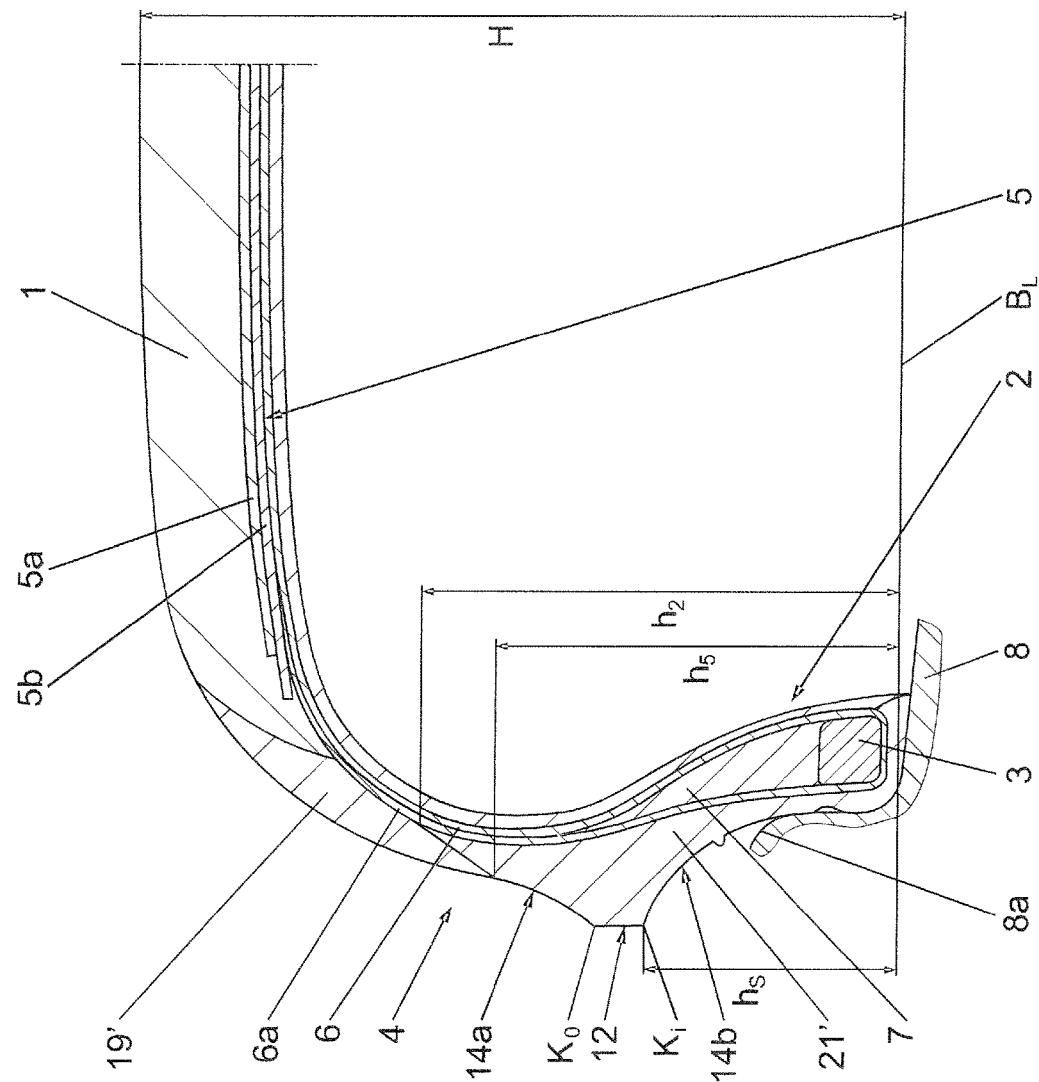

FIGS. 3 and 4 show embodiments without a sidewall rubber. In the case of the embodiment represented in FIG. 3, the wing rubber 19 runs laterally of the tread 1 over the tire shoulder into the protective rib 12, thereby includes both edges $K_O$ and $K_i$ and therefore forms a large part of the protective rib 12. The radially inner end of the wing rubber 19 is at the distance $h_3$ from the line $B_L$, as described above. The wing rubber 19 covers on the outside the radially outer end portion of the rim protection rubber 21, which in the covered region runs out in a narrowing manner in the direction of the tread 1. The radially outer end of the rim protection rubber 21 is at a distance h2 from the baseline $B_L$ that is between 45% and 70% of the cross-sectional height H. Otherwise, the rim protection rubber 21 is designed in a way analogous to the previous embodiments.

FIG. 4 shows an embodiment of the invention in which the rim protection rubber 21' reaches so far in the direction of the tread 1 that it forms the protective rib 12 and has on its outside at least a large part of the concave outer contour 14$a$ and the concave outer contour 14$b$. The radially outer end portion of the rim protection rubber 21' is covered on the outside over a short distance by the wing rubber 19' and ends at a distance $h_2$ from the baseline BL that is between 45% and 70% of the cross-sectional height H. The radially inner end of the wing rubber 19' is at a distance $h_5$ from the baseline $B_L$ that is between 40% and 60% of the cross-sectional height H and is less than $h_2$.

The embodiments shown in FIGS. 5 to 8 correspond substantially to those according to FIGS. 1 to 4, the sidewall regions 4 having radially outside the locations K a concavely curved outer contour and radially inside a convexly curved outer contour. The distances $h_1$ to $h_5$ given in the description which follows correspond to the distances $h_1$ to $h_5$ from the embodiments according to FIGS. 1 to 4 and have the already specified sizes or relative sizes. The same applies analogously to the widths $b_1$, $b_2$ and $b_3$.

Figure 5:
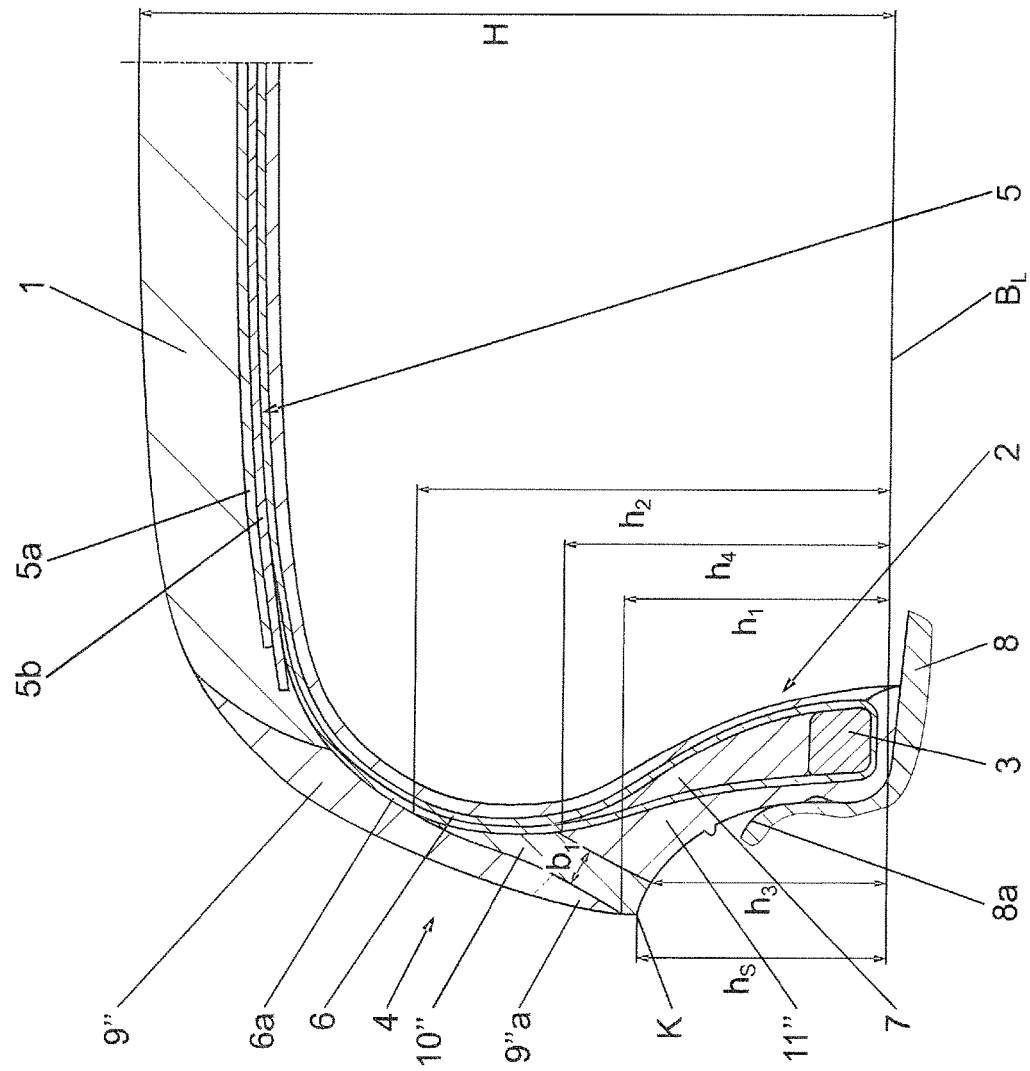

FIG. 5 therefore shows an embodiment in which the wing rubber 9" covers with a strip-shaped extension 9"$a$ the sidewall rubber 10". The sidewall rubber 10", running as a wide strip substantially between the wing rubber 9" and the rim protection rubber 11", ends with its radially outer, narrowing end portion at the distance $h_2$ from the baseline $B_L$; the radially inner end of the wing rubber 9" is at the distance $h_1$ from the baseline $B_L$. In the case of the design shown in FIG. 5, the sidewall rubber 10" also includes the edge K. The arrangement and design of the rim protection rubber 11" correspond substantially to those of the embodiment shown in FIG. 1, with the distances $h_3$ and $h_4$ at the boundary lines with respect to the sidewall rubber 10".

Figure 6:
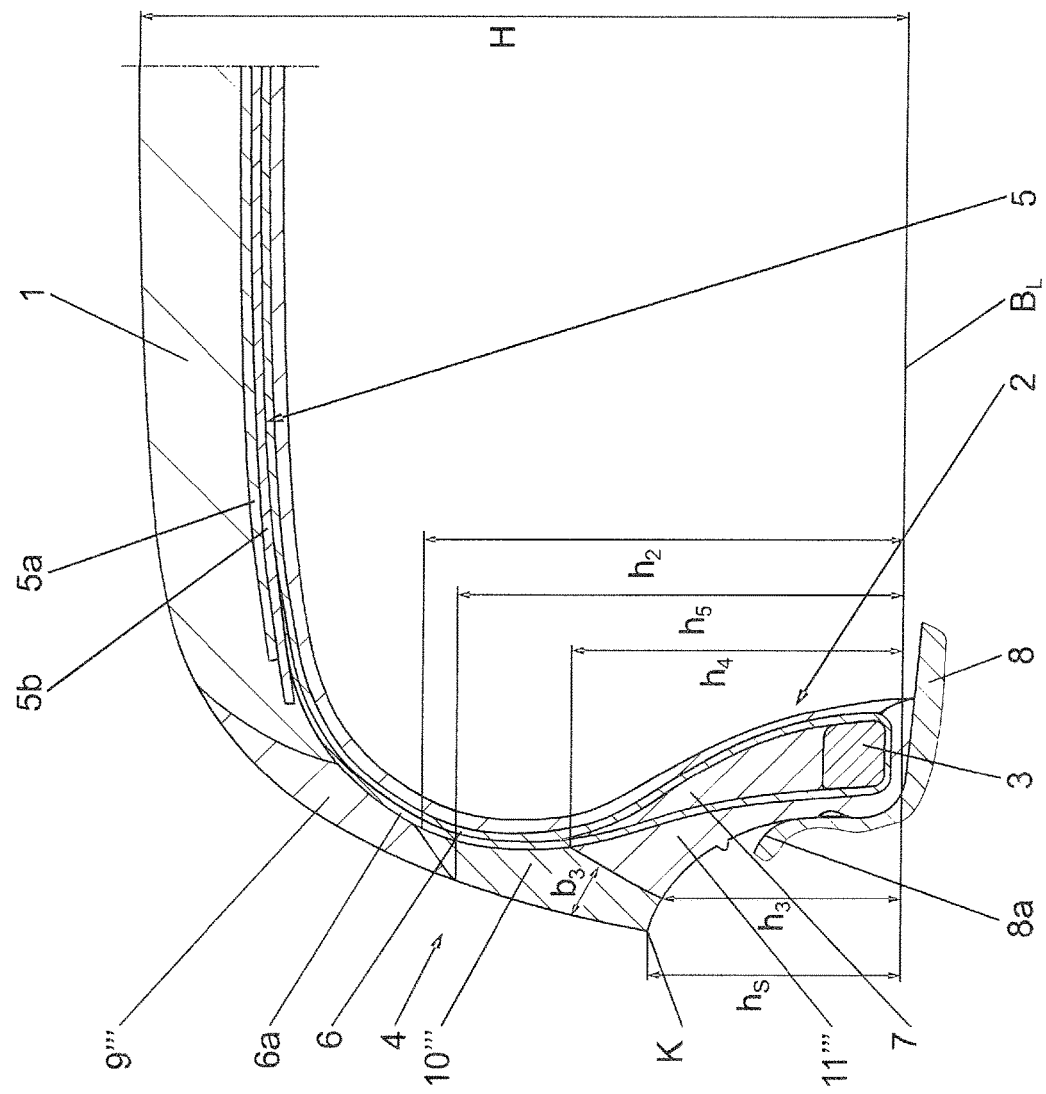

FIG. 6 shows an embodiment in which the sidewall rubber 10''' runs over a greater region of the concavely curved outer surface of the sidewall region 4 and likewise comprises the edge K. The sidewall rubber 10''' and the wing rubber 9''' cover one another with narrowing end portions in such a way that the radially outer end of the sidewall rubber 10''' is at the distance $h_2$ from the baseline $B_L$ and the radially inner end of the wing rubber 9''' is at the distance $h_5$ from the baseline $B_L$, $h_5$ being less than $h_2$. The arrangement and design of the rim protection rubber 11''', with the radial extent determined by the distances $h_3$ and $h_4$, corresponds to the embodiment according to FIG. 5.

Figure 7:
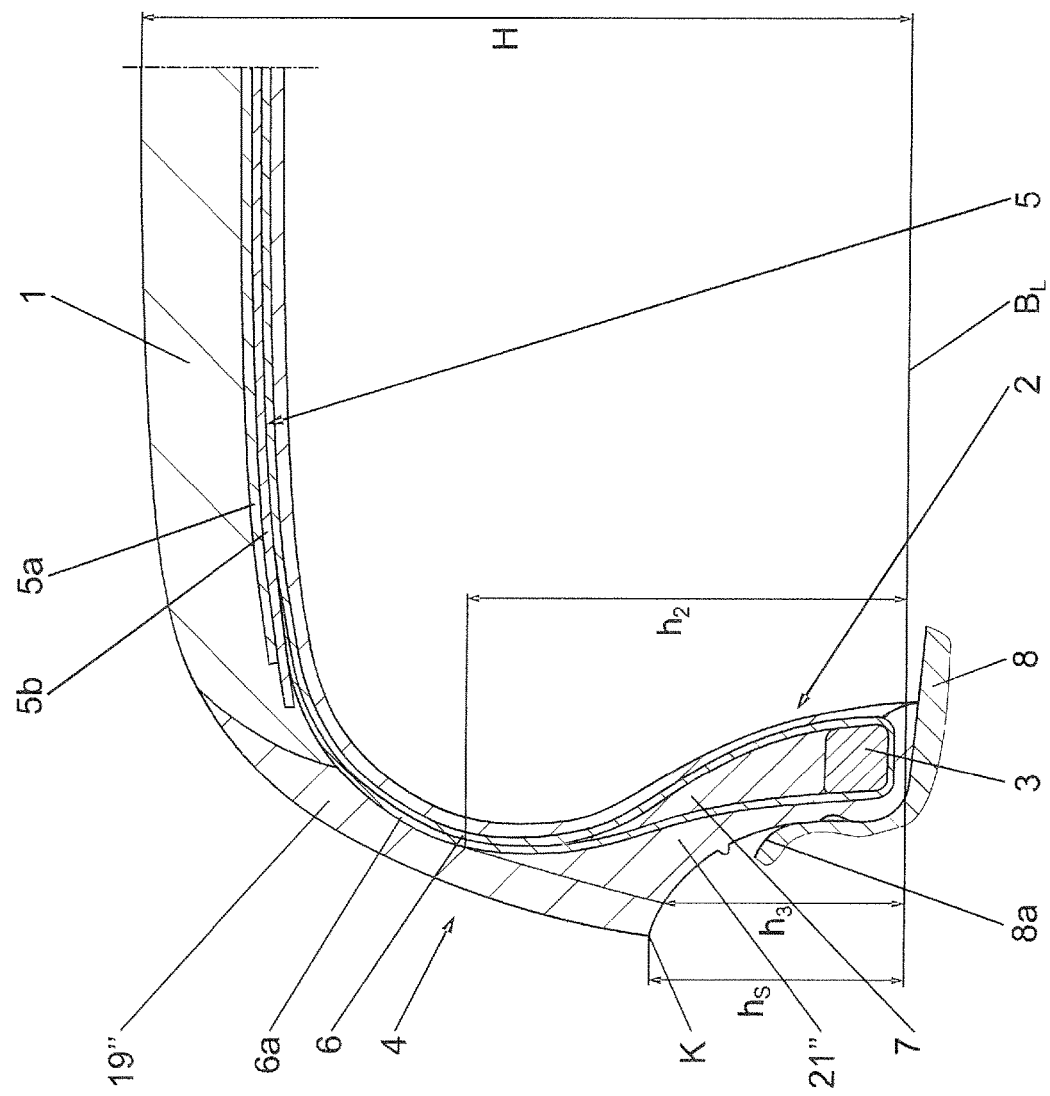
Figure 8:
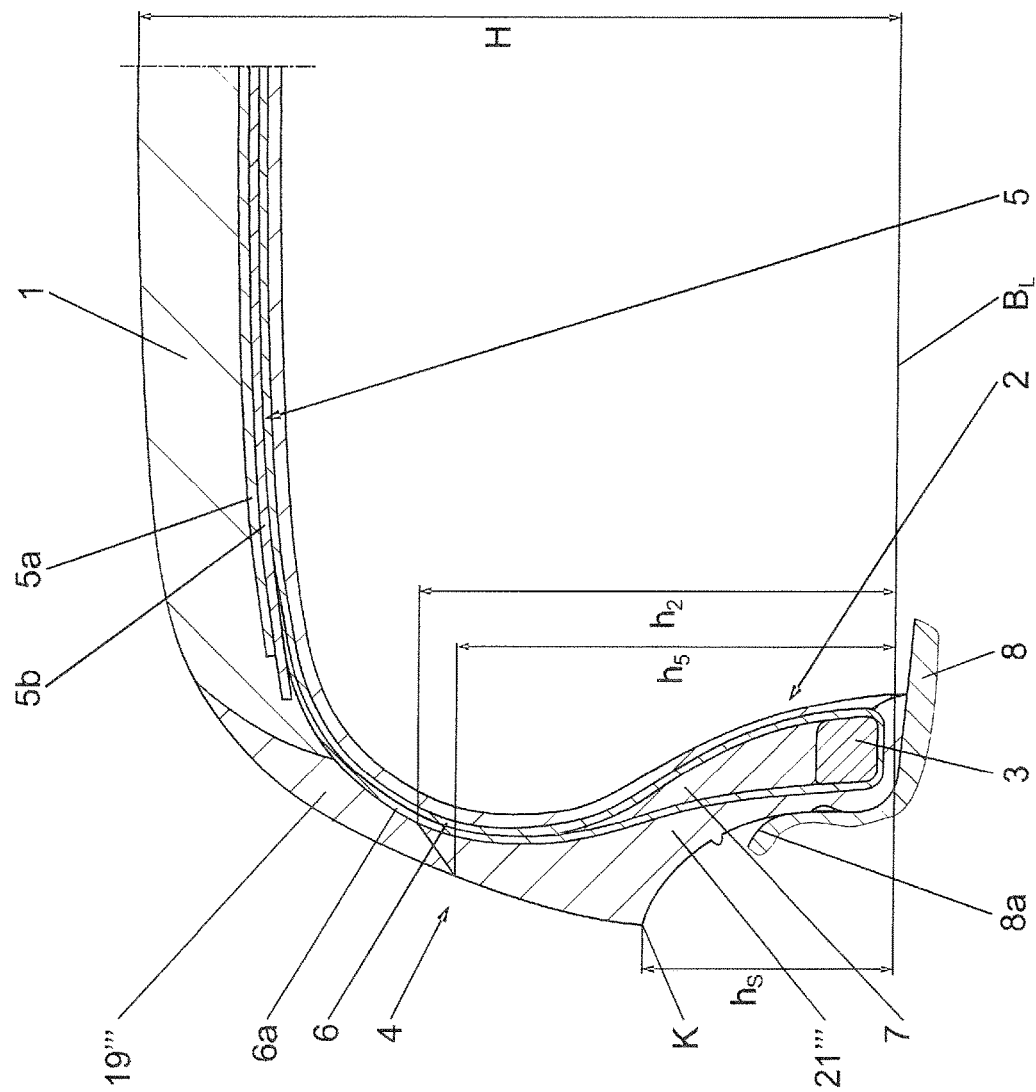

In FIGS. 7 and 8, embodiments without a sidewall rubber are represented. In FIG. 7, the wing rubber 19" runs in the radial direction over a large part of the sidewall region 4, includes the edge K and ends with its radially inner end at the distance $h_3$ from the baseline $B_L$. The rim protection rubber 21" directly adjoining the wing rubber 19" has a radially outer, narrowing end portion, which is covered on the outside by the wing rubber 19" and which ends at the distance $h_2$ from the baseline $B_L$. In the case of the embodiment shown in FIG. 8, the rim protection rubber 21''' is that component of the sidewall region 4 that has the greatest extent over the sidewall region 4. Its radially outer end portion is covered over a relatively short distance by the radially inner end portion of the wing rubber 19''' in such a way that the radially outermost end of the rim protection rubber 21''' is at the distance $h_2$ from the baseline $B_L$ and the radial end of the bead rubber 19''' is at the distance $h_5$, which is less than $h_2$, from the baseline $B_L$.

The wing rubber (9, 9', 9", 9''', 19, 19', 19", 19''') is produced from a rubber mixture that preferably has good weather resistance and good light resistance. The rubber mixture for the wing rubber (9, 9', 9", 9''', 19, 19', 19", 19''') is therefore based in particular on EPDM, natural rubber and polybutadiene rubber, and may be one of the wing rubber mixtures that is customary and known.

The sidewall rubber (10, 10', 10", 10''') consists of one of the customary and known sidewall rubber mixtures.

Rubber mixtures that have a comparatively high abrasion resistance and a comparatively great hardness come into consideration for the rim protection rubber (11, 11', 11", 11''', 21, 21', 21", 21'''). The known and customary rim protection rubber mixtures are suitable.

It is understood that the foregoing description is that of the preferred embodiments of the invention and that various changes and modifications may be made thereto without departing from the spirit and scope of the invention as defined in the appended claims.

LIST OF REFERENCE CHARACTERS

1 . . . tread
2 . . . bead region
3 . . . bead core
4 . . . sidewall region
5 . . . ply structure
5$a$ . . . bracing ply
5$b$ . . . bracing ply
6 . . . radial carcass
6$a$ . . . turned-back portion 7 . . . bead filler
8 . . . rim
8a . . . rim flange
9,9',9",9"' . . . wing rubber
19,19' . . . wing rubber
19",19"' . . . wing rubber
9a,9"a . . . wing rubber strip
10,10' . . . sidewall rubber
10",10"' . . . sidewall rubber
11,11' . . . rim protection rubber
11",11"' . . . rim protection rubber
21,21' . . . rim protection rubber
21",21"' . . . rim protection rubber
12 . . . protective rib
14a,14b . . . concave outer contour
$K_i$ . . . inner edge
$K_O$ . . . outer edge
K . . . edge
H . . . cross-sectional height
$h_1$ . . . distance
$h_2$ . . . distance
$h_3$ . . . distance
$h_4$ . . . distance
$h_5$ . . . distance
$b_1$ . . . width
$b_2$ . . . width
$b_3$ . . . width
$B_L$ . . . baseline

What is claimed is:

1. A pneumatic vehicle tire defining an axial direction and an axial outermost point measured in said axial direction, an imaginary baseline ($B_L$) which contacts the outer end of a rim radius of a standard rim corresponding to the pneumatic vehicle tire dimensions, and having a nominal tire cross-section height (H) measured from the baseline ($B_L$) of at most 100 mm, the pneumatic vehicle tire comprising:
    a tread having a lateral side;
    a ply structure;
    a bead core;
    a radial carcass having a bead region in which said radial carcass extends around said bead core from axially inside to axially outside and with a turned-back portion that is guided so as to extend back up to underneath said ply structure to form an overlapping region between said turned-back portion and said ply structure;
    a wing rubber extending from said lateral side of said tread in the direction of said bead region;
    a rim protection rubber extending from said bead region in the direction of said wing rubber;
    at least said wing rubber, said rim protection rubber, and a sidewall rubber component conjointly defining a sidewall having a radially outer portion;
    said wing rubber having a radial inner end section covering said sidewall rubber component that adjoins said wing rubber in a covered region in the direction toward said bead region;
    said sidewall rubber component having a first tapered end section in said covered region of the sidewall rubber component and said sidewall rubber component extending from the first tapered end section thereof down to an end surface of the rim protection rubber;
    said first tapered end section of said sidewall rubber component being tapered in the direction of said tread;
    said first tapered end section of said sidewall rubber component having an end that is at a distance ($h_2$) from the baseline ($B_L$);
    said wing rubber being the only sidewall region rubber element that extends to said tread and said wing rubber being in direct contact with said turned-back portion of said carcass in said radially outer portion of said sidewall that is radially above the distance ($h_2$) from the baseline ($B_L$);
    said distance ($h_2$) being between 45% and 70% of said cross-section height (H);
    said radial inner end section covering said sidewall rubber component extending in the direction toward said bead region so as to cause said radial inner end section to be present at said axial outermost point of said tire; and
    said rim protection rubber extending radially beneath the bead core and terminating at a position axially inward of an axially inner surface of said bead core,
    wherein said pneumatic vehicle tire has an axially outermost tire surface defined by a combination of said wing rubber and said sidewall rubber component.

2. A pneumatic vehicle tire defining an axial direction, an imaginary baseline ($B_L$) which contacts the outer end of a rim radius of a standard rim corresponding to the pneumatic vehicle tire dimensions, and having a nominal tire cross-section height (H) measured from the baseline ($B_L$) of at most 100 mm, the standard rim defining a contact surface for receiving the pneumatic vehicle tire thereon, the pneumatic vehicle tire comprising:
    a tread having a lateral side;
    a ply structure;
    a bead core;
    a radial carcass having a bead region in which said radial carcass extends around said bead core from axially inside to axially outside and with a turned-back portion that is guided so as to extend back up to underneath said ply structure to form an overlapping region between said turned-back portion and said ply structure;
    a wing rubber extending from said lateral side of said tread in the direction of said bead region;
    a rim protection rubber extending from said bead region in the direction of said wing rubber;
    at least said wing rubber, said rim protection rubber, and a sidewall rubber component conjointly defining a sidewall having a radially outer portion;
    said wing rubber having a radial inner end section covering said sidewall rubber component that adjoins said wing rubber in a covered region in the direction toward said bead region;
    said sidewall rubber component having a first tapered end section in said covered region of the sidewall rubber component and said sidewall rubber component extending from the first tapered end section thereof down to an end surface of the rim protection rubber;
    said first tapered end section of said sidewall rubber component being tapered in the direction of said tread;
    said first tapered end section of said sidewall rubber component having an end that is at a distance ($h_2$) from the baseline ($B_L$);
    said wing rubber being the only sidewall rubber element that extends to said tread and said wing rubber being in direct surface-to-surface contact with said turned-back portion of said carcass in said radially outer portion of said sidewall that is radially above the distance ($h_2$) from the baseline ($B_L$);
    said distance ($h_2$) being between 45% and 70% of said cross-section height (H);
    said contact surface and said bead region conjointly defining an interface; and, said rim protection rubber becoming continuously thinner while running down from said end surface thereof into said bead region whereat said rim protection rubber assumes the form of a strip along said contact surface so as to extend over all of said interface and so causing said sidewall to extend from said interface up to said lateral side of said tread, and said rim protection rubber extending radially beneath the bead core and terminating at a position axially inward of an axially inner surface of said bead core, wherein said pneumatic vehicle tire has an axially outermost tire surface defined by a combination of said wing rubber and said sidewall rubber component.

3. The pneumatic vehicle tire of claim 2, wherein said sidewall rubber component is a strip-shaped sidewall rubber.

4. The pneumatic vehicle tire of claim 3, wherein:

said wing rubber has a second tapered end section which covers said first tapered end section of said strip-shaped sidewall rubber;

said wing rubber has a radial inner end which is at a distance ($h_5$) from the baseline ($B_L$); and, said distance ($h_5$) is less than said distance ($h_2$) and between 40% and 60% of said nominal tire cross-section height (H) from said baseline ($B_L$).

5. The pneumatic vehicle tire of claim 2, wherein said sidewall rubber has a middle section having a width ($b_1$) between 2 mm and 4 mm.

* * * * *